(12) United States Patent
Yamada (10) Patent No.: US 7,178,292 B2
(45) Date of Patent: Feb. 20, 2007

(54) DUAL-OPENING MECHANISM OF DOOR

(75) Inventor: Akifumi Yamada, Nakano-ku (JP)

(73) Assignee: Takigen Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/566,113

(22) PCT Filed: Jul. 14, 2004

(86) PCT No.: PCT/JP2004/010031

§ 371 (c)(1),
(2), (4) Date: Jan. 24, 2006

(87) PCT Pub. No.: WO2005/010304

PCT Pub. Date: Feb. 3, 2005

(65) Prior Publication Data

US 2006/0196120 A1    Sep. 7, 2006

(30) Foreign Application Priority Data

Jul. 25, 2003   (JP) .............................. 2003-280062

(51) Int. Cl.
*E05D 15/50* (2006.01)
(52) U.S. Cl. .............................. 49/193; 49/382; 16/229
(58) Field of Classification Search .................. 49/193, 49/382; 16/229, 230; 312/324
See application file for complete search history.

(56) References Cited

U.S. PATENT DOCUMENTS

| 707,910 A | * | 8/1902 | Fischer et al. ................. 16/230 |
| 2,166,534 A | * | 7/1939 | Rosenfeld ..................... 16/232 |
| 2,745,132 A | * | 5/1956 | Clark et al. ................... 16/232 |
| 5,357,652 A | * | 10/1994 | Yamada ....................... 16/232 |
| 5,367,828 A | * | 11/1994 | Hashemnia .................. 49/382 |
| 5,926,916 A | * | 7/1999 | Lee et al. ..................... 16/230 |

FOREIGN PATENT DOCUMENTS

| JP | 50-1537 A | 1/1975 |
| JP | 54-79230 U | 6/1979 |
| JP | 56-70065 U | 6/1981 |
| JP | 56-140669 U | 10/1981 |
| JP | 58-111772 U | 7/1983 |

(Continued)

OTHER PUBLICATIONS

PCT International Preliminary Report on Patentability for PCT/JP2004/010031 issued on May 15, 2006.

*Primary Examiner*—Jerry Redman
(74) *Attorney, Agent, or Firm*—Darby & Darby (57) ABSTRACT

A door can be opened from either direction, from the left or the right. A double direction opening mechanism for a door has a first and second hinge pairs (5, 6), a first and a second hinge pin drive mechanism (7, 8), and a first and a second handle (91, 92). When either the first or the second handle (91, 92) is selectively operated, either the first or the second hinge pin pair (53, 63) is drawn out from either the first or the second hinge pair (5, 6). Then, a door (3) is rotated for opening/closing about either or the hinge pin pairs (53, 63) joined to the other of the first or the second hinge pair (5, 6).

4 Claims, 5 Drawing Sheets

FOREIGN PATENT DOCUMENTS

| | | |
|---|---|---|
| JP | 6-8654 U | 2/1994 |
| JP | 08-100566 A | 4/1996 |
| JP | 3030486 U | 11/1996 |
| JP | 10-088898 A | 4/1998 |
| JP | 2001-262933 A | 9/2001 |
| JP | 2001-307200 A | 11/2001 |

* cited by examiner

DUAL-OPENING MECHANISM OF DOOR

FIELD OF ART

The present invention relates to a dual-opening mechanism of a door for use in a cabinet for a distribution board, a server rack, or the like.

BACKGROUND ART

A conventional door of a cabinet for a distribution board or the like is mounted to a cabinet body for opening/closing motion by means of hinges fixed in either right or left side Of the door, and is equipped with a lock device fixed in the opposite side of the door. Such a lock device is composed of a shaft rotationally operated with a handle, a lever and a latch rotating with the shaft, a pair of rods moving up and down in response to the motion of the lever, an engagement roller attached to an end of the rod, and the like elements. The latch and the engagement roller engage the inner periphery of the opening of the cabinet body to prevent opening operation of the door. When the shaft-is rotated by operating the handle, the latch and the engagement roller move back and are released from the engagement with the inner periphery of the opening (for example, Patent Publication 1).

Patent Publication 1: JP-8-100556-A

SUMMARY OF THE INVENTION

However, the conventional cabinet door is opened/closed from only one side, left or right, and the position and orientation of cabinet installation are limited by the side from which the door is opened. The door may not even be opened when there is an obstacle, such as a man or an article, in front of the door on its opening side. Further, the conventional door requires a lock device separate from a hinge.

The present invention aims to solve the above problems of the prior art. It is an object of the present invention to provide a dual-opening mechanism of a door which enables the door to be opened from either the left or right side, which allows arbitral position and orientation of cabinet installation, which, even when there is an obstacle on the right or left side of the door, allows the door to be opened freely from the other side, and which enables the hinge to serve also as a lock device.

For solving these problems, according to the present invention, there is provided a dual-opening mechanism of a door comprising:

first and second pairs of hinges comprising:

first and second pairs of stationary hinge parts each having a hinge knuckle, and each pair attached on the opposite sides of an opening of a casing, first and second pairs of moving hinge parts releasable from said first and second pairs of stationary hinge parts, each having hinge knuckles, and each pair attached in the opposite sides of a door for opening and closing said opening of the casing, and first and second pairs of hinge pins, one pair removably inserted into the hinge knuckles of one of said first and second pairs of stationary hinge parts and into the hinge knuckles of one of said first and second pairs of moving hinge parts, and the other pair into the hinge knuckles of the other of said first and second pairs of stationary hinge parts and into the hinge knuckles of the other of said first and second pairs of moving hinge parts, to couple said stationary hinge parts to said moving hinge parts, first and second hinge pin drive mechanisms, each moving one of said first and second pairs of hinge pins together in inward and outward linear motion to drive the hinge pins into or out of the hinge knuckles of the stationary and moving hinge parts; and first and second handles each operatively linked to one of said first and second hinge pin drive mechanisms for operating the first or second pair of hinge pins;

wherein the door is opened/closed by selectively operating either one of said first and second handles to draw either one of said first and second pairs of hinge pins out of the corresponding one of said first and second pairs of hinges, and pivoting the door around the other pair of hinge pins coupled to the corresponding other of the first and second pairs of hinges.

With such a structure, the door may be locked by coupling each of the first and second pairs of moving hinge parts to each of the first and second pairs of stationary hinge parts with each of the first and second pairs of hinge pins in the opposite sides of the door. From this locked state, by selectively operating either one of the first and second handles to draw either one of the first and second pairs of hinge pins out of the corresponding one of the first and second pairs of hinges, the door may be opened/closed by pivoting around the other of the first and second pairs of hinge pins coupled to the corresponding other of the first and second pairs of hinges. Thus the door may be opened from either the left or right side when the dual-opening mechanism of a door is provided in the left and right sides of the door. Alternatively, the door may be opened from either the upper or lower side when the dual-opening mechanism of a door is provided in the upper and lower sides of the door. This allows arbitral position and orientation of the cabinet installation, and even when there is an obstacle on the right or left side, or the upper or lower side of the door, the door may still be opened freely from the other side. The hinges may also be used as locking means for the door.

The present invention may preferably be embodied as follows.

First, the hinge knuckle of each stationary hinge part is adapted to be fitted between the hinge knuckles of each moving hinge part, and at least one of the hinge knuckles of the stationary and moving hinge parts is provided with beveled guide portions at its connecting ends for guiding the hinge knuckle of the stationary hinge part into or out of the position between the hinge knuckles of the moving hinge part.

With this structure, when the door is opened, the hinge knuckles of the moving hinge part may be released from the hinge knuckle of the stationary hinge part. In this motion, the beveled guide portions on the hinge knuckles eliminate friction between the hinge knuckles to facilitate extraction of the hinge knuckle of the stationary hinge part from between the hinge knuckles of the moving hinge part. When the door is closed, the hinge knuckle of the stationary hinge part is fitted between the hinge knuckles of the moving hinge part. In this motion, the beveled guide portions on the hinge knuckles eliminate friction between the hinge knuckles, lead the hinge knuckle of the stationary hinge part into the position between the hinge knuckles of the moving hinge part, and facilitate coupling of the stationary hinge part to the moving hinge part, with the axes of the hinge knuckles of the stationary and moving hinge parts being aligned.

Second, a quench hardened collar member is press fitted on the inner periphery of each hinge knuckle of the stationary and moving hinge parts, and each hinge pin has a tapered tip and has been quench hardened.

With this structure, increase in sliding resistance may be prevented, which is caused by frictional rattling or galling between the hinge pins and the hinge knuckles of the stationary and moving hinge parts upon insertion and removal of the hinge pins with respect to the knuckles.

Third, the dual-opening mechanism of a door may further include a door position adjusting device. This device has a follower part formed on the door, which projects toward the casing and has an end curved outward; and a guide part formed on the casing, which projects toward the door and has an end curved inward. In closing the door, the follower part is brought into contact with the end of the guide part, and slidingly guided onto the outer surface of the guide part to lead the door into the right position on the face of the casing having the opening.

With this structure, even when the door is very heavy and when opened, hangs down out of alignment with the casing, the follower part on the door side is guided by the guide part on the casing side in closing the door, and accordingly, the door may be led into the right position on the face of the casing having the opening. With this positional adjustment of the door, the moving hinge part may securely be aligned with the stationary hinge part, and the hinge pins may be inserted into the hinge parts securely and smoothly.

According to the dual-opening mechanism of a door according to the present invention, by providing the dual-opening mechanism of a door in the left and right sides of a door, the door may be opened from either the left or right side, and by providing this mechanism in the upper and lower sides of a door, the door maybe opened from either the upper or lower side. This allows arbitral position and orientation of the cabinet installation, and even when there is an obstacle on the right or left side, or the upper or lower side of the door, the door may still be opened freely from the other side. The hinges may also be used as locking means for the door.

DESCRIPTION OF REFERENCE SIGNS 1 cabinet body (casing)
2 opening
3 door
first door position adjusting device
32 second door position adjusting device
301 follower plate
302 guide plate
4 dual-opening mechanism of door
5 first pair of hinges
6 second pair of hinges
51, 61 stationary hinge part
52, 62 moving hinge part
53, 63 hinge pin
561 mounting plate
562 hinge knuckle
563 beveled guide portion
564 collar member
565 mounting plate
566 hinge knuckle
567 beveled guide portion
568 collar member
7 first hinge pin drive mechanism
8 second hinge pin drive mechanism
781, 782 vertical rod
783, 784 housing
91 first handle
92 second handle
93, 94 cylinder lock

PREFERRED EMBODIMENTS OF THE INVENTION

Figure 1:
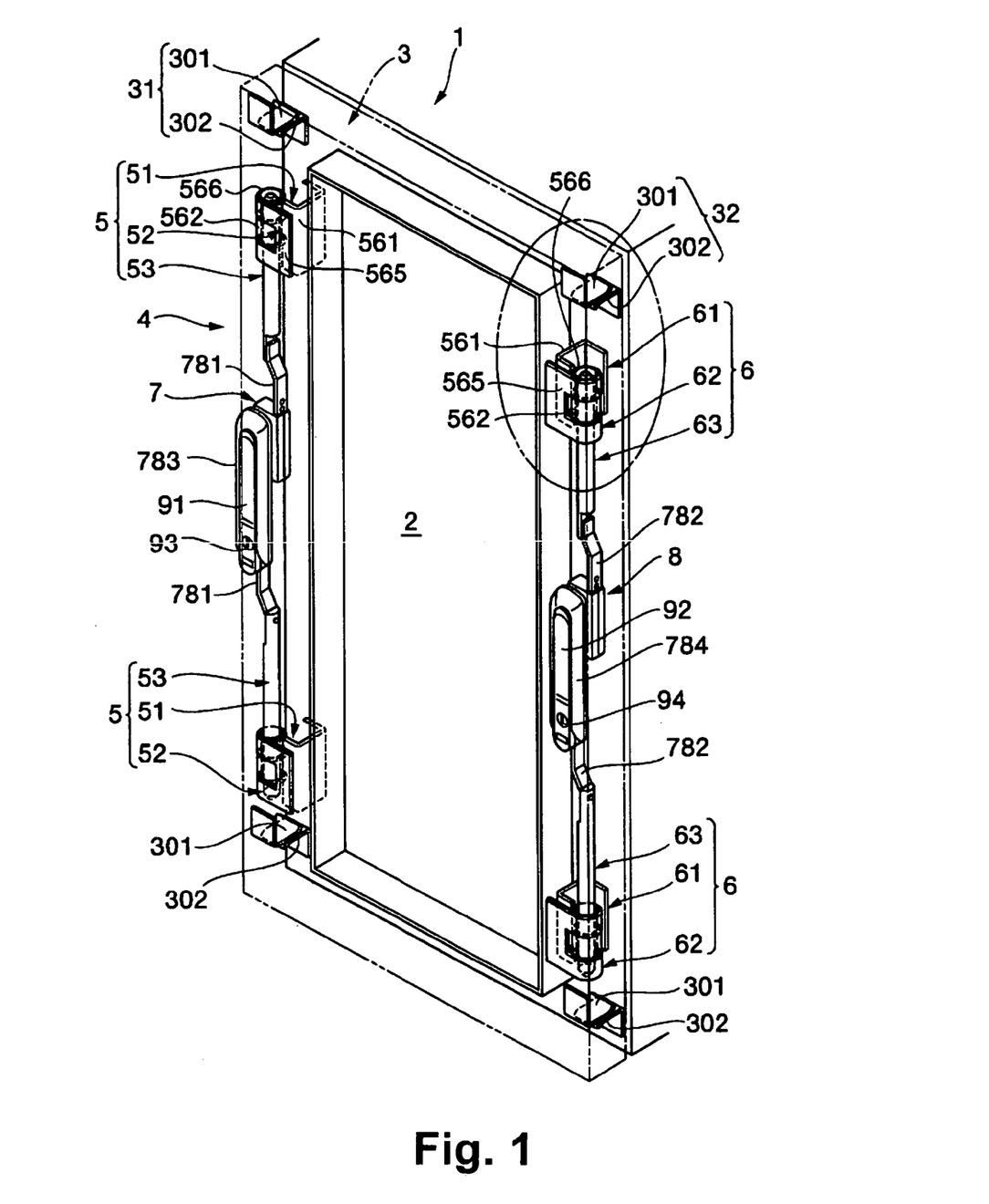
FIG. 1 is a general perspective view showing the dual-opening mechanism of a door as a best mode of the present invention.

The best mode of the present invention will now be explained with reference to the attached drawings. Referring to FIG. 1, 1 refers to a cabinet body (casing), which is in the shape of a generally elongate box made of steel plates or the like, and has an opening 2 formed in its front face. The opening 2 is formed in a rectangular shape slightly smaller than the outline of the front face of the cabinet body 1, and is projected forward from the front wall of the cabinet body 1 in a frame form. 3 refers to a door for opening/closing the opening 2 of the cabinet body 1. The door 3 is made of a steel plate or the like material, and includes a principal face wall having the same shape and size as the outline of the front face of the cabinet body 1, and circumferential walls bent along and formed continuously from the edges of the principal face wall. The door 3 is in a thin box shape open on the inner face. 4 refers to a dual-opening mechanism of a door, which is adapted to open/close the door 3 from either the left or right side of the door 3. The dual-opening mechanism 4 of a door includes first and second pairs of hinges 5, 6, first and second hinge pin drive mechanisms 7, 8, and first and second handles 91, 92.

The first and second pairs of hinges 5, 6 are composed of first and second pairs of stationary hinge parts 51, 51, 61, 61, first and second pairs of moving hinge parts 52, 52, 62, 62, and first and second pairs of hinge pins (dead bolts) 53, 53, 63, 63, respectively.

Figure 2:
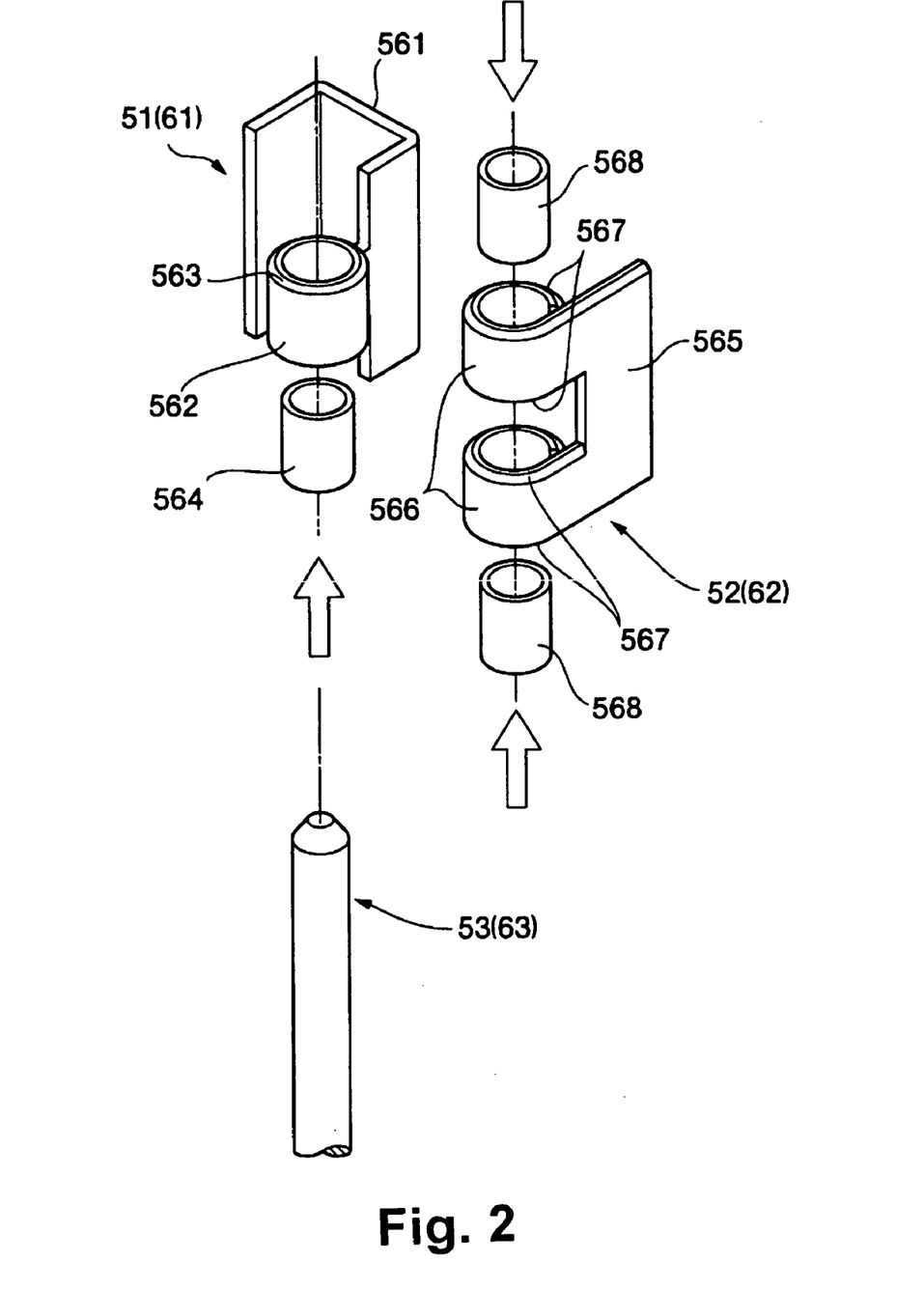
FIG. 2 is an enlarged perspective view with partial omission, showing the structure of a hinge used in the dual-opening mechanism of the present invention.

The stationary hinge parts 51, 61 have the same shape. As shown in FIG. 2, each stationary hinge part has a mounting plate 561 having a plan cross section of a square horseshoe shape, and a hinge knuckle 562 formed integrally with the mounting plate 561 on the lower part of one of its side edges and having a shape of a cylinder with its longitudinal axis vertically oriented. The upper and lower opening edges of the hinge knuckle 562, which act as connecting ends to hinge knuckles 566 of the moving hinge part 52, 62, are tapered (in this case, the outer diameter is gradually increased from the opening end of the hinge knuckle 562 toward the outer periphery) to form beveled guide portions 563. On the inner periphery of the hinge knuckle 562, a collar member 564, which has been quench hardened, is press fitted. The first pair of upper and lower stationary hinge parts 51, 51 are provided by fixing the intermediate face of the mounting plate 561 of each stationary hinge part 51 to either the right or left side of the opening 2 of the cabinet body 1, with the hinge knuckle 562 facing forward. Similarly, the second pair of upper and lower stationary hinge parts 61, 61 are provided on the other side of the opening 2, symmetrically to the first pair of stationary hinge parts 51, 51.

The moving hinge parts 52, 62 have the same shape. As shown in FIG. 2, each moving hinge part has a mounting plate 565 having a plan cross section of a linear shape, and hinge knuckles 566 formed by cutting out a portion of the plate from one edge thereof in the form of a square horseshoe shape, and curling from that edge. As in the stationary hinge parts 51, 61, the upper and lower opening edges of the hinge knuckles 566, which act as connecting ends to the hinge knuckle 562 of the stationary hinge part 51, 61, are also tapered (in this case, the outer diameter is gradually increased from the opening end of the hinge knuckle 566 toward the outer periphery) to form beveled guide portions 567. On the inner periphery of each hinge knuckle 566, a collar member 568, which has been quench hardened, is press fitted. The first pair of upper and lower moving hinge parts 52, 52 are provided by fixing the flat face of the mounting plate 565 of each moving hinge part 52 in either the right or left side of the door 3, so that the hinge knuckle 562 of the stationary hinge part 51 is insertable between the two hinge knuckles 566, 566. Similarly, the second pair of upper and lower moving hinge parts 62, 62 are provided in the other side of the door 3, symmetrically to the first pair of moving hinge parts 52, 52.

The hinge pins 53, 63 have the same shape. As shown in FIG. 2, each hinge pin is in the form of a round rod having predetermined diameter and length for free insertion into the hinge knuckles 562 and 566 of the stationary and moving hinge parts 51, 61, 52, 62, respectively. Each hinge pin 53, 63 has a tapered tip, and has been quench hardened. Each hinge pin 53, 63 is operatively linked to the upper or lower end of the first or second hinge pin drive mechanism 7, 8, respectively. Each of the upper hinge pins 53, 63 is inserted into the hinge knuckles 562, 566 of the upper stationary and moving hinge parts 51, 52, or 61, 62, respectively, and each of the lower hinge pins 53, 63 is inserted into the hinge knuckles 562, 566 of the lower stationary and moving hinge parts 51, 52 or 61, 62, respectively, to thereby couple each stationary hinge part 51, 61 and each moving hinge part 52, 62, respectively.

Each of the first and second hinge pin drive mechanisms 7, 8 employs the mechanism of a conventional handle lock device. Though the internal structure of the mechanism is not shown in the drawings, each of the first and second hinge pin drive mechanisms 7, 8 may be composed of a shaft operatively linked to the handle 91, 92, and rotated by operation of the handle; a lever rotated in the same direction as the shaft; a pair of vertical rods 781, 782 moved vertically in response to the motion of the lever; a housing 783, 784 accommodating these elements; and like components. Each hinge pin drive mechanism 7, 8 is attached on the inner side of the door 3, and the hinge pins 53, 63 are connected to the ends of the vertical rod 781, 782, respectively. It should be understood that the drive mechanisms 7, 8 are not limited to a type employing a lever, and may be of other appropriate type, such as a rack-and-pinion type, wherein the pair of vertical rods are driven by engagement between a pinion cooperatively coupled to the shaft and a rack inserted into and fixed to the middle of the vertical rod. In this way, ill response to the rotational operation of the handle 91, 92, a pair of hinge pins 53 or 63 are moved together in downward and upward (inward and outward) linear motion, and driven into or out of the hinge knuckles 562 and 566 of the stationary and moving hinge parts 51 and 52 or 61 and 62, respectively.

Each of the first and second handles 91, 92 employs a conventional handle mechanism. Though the internal structure of the mechanism is not shown in the drawings, lock handle devices of a rotational operation type are embedded in and fixed in the front face of the door. Here, the handle 91, 92 is pivotably attached to the housing 783, 784, with the rear surface of the handle 91, 92 being placed in the housing 783, 784, respectively. The handle 91, 92 takes a position pressed down in the housing 783, 784 and a position lifted up from the housing 783, 784, and is rotationally operated in the lifted-up position. The handle 91, 92 pressed down in the housing 783, 784 is locked with a cylinder lock 93, 94 to prevent it from being lifted up, and thus becomes unreleasable. The handles 91, 92 are not limited to the mortise type, and may be of various other types.

The dual-opening mechanism 4 of a door may be provided in combination with first and second door position adjusting devices 31 and 32, as shown in FIG. 1. Each adjusting device 31, 32 has a pair of follower plates 301, 301 and a pair of guide plates 302, 302. Each follower plate 301 is formed in a generally L-shape, and has an end curved upward (outward). Each guide plate 302 is formed in a generally reverse L-shape, and has an end curved downward (inward)

In either one of the left and right sides of the door 3, one of the pair of follower plates 301 is fixed above the upper moving hinge part 52 or 62, and the other of the follower plates 301 is fixed below the lower moving hinge part 52 or 62. In either one of the left and right sides of the cabinet body 1, one of the pair of guide plates 302 is fixed above the upper stationary hinge part 51 or 61 at a position suitable for supporting the upper follower plate 301 so as to support the door 3 in the right position on the front face of the cabinet body 1, and the other of the guide plates 302 is fixed below the lower stationary hinge part 51 or 61 at a position suitable for supporting the lower follower plate 301 so as to support the door 3 in the right position on the front face of the cabinet body 1. In this way, the first door position adjusting device 31 is formed.

Similarly, in the other side of the door 3, one of the pair of follower plates 301 is fixed above the upper moving hinge part 52 or 62, and the other of the follower plates 301 is fixed below the lower moving hinge part 52 or 62. In the other side of the cabinet body 1, one of the pair of guide plates 302 is fixed above the upper stationary hinge part 51 or 61 at a position suitable for supporting the upper follower plate 301 so as to support the door 3 in the right position on the front face of the cabinet body 1, and the other of the guide plates 302 is fixed below the lower stationary hinge part 51 or 61 at a position suitable for supporting the lower follower plate 301 so as to support the door 3 in the right position on the front face of the cabinet body 1. In this way, the second door position adjusting device 32 is formed. In closing the door 3, the follower plates 301 of the first and second door position adjusting devices 31 and 32 are brought into contact with the ends of the guide plates 302, and slidingly guided onto the upper surfaces (outer surfaces) of the guide plates 302, whereby the door 3 is led to the right position on the face of the cabinet body 1 having the opening 2.

Figure 3:
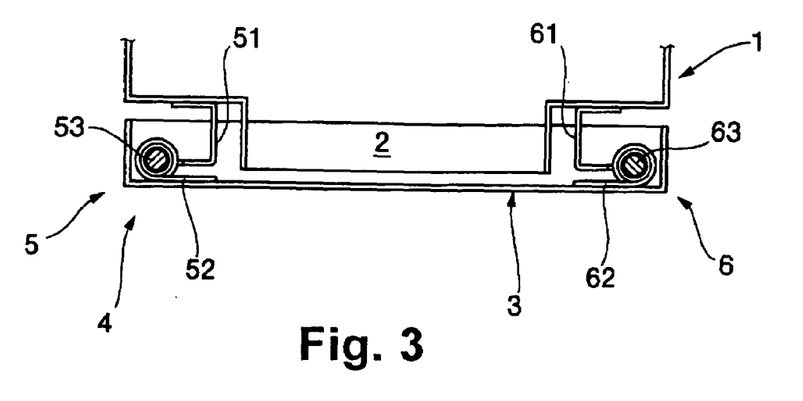
FIG. 3 is a plan sectional view illustrating the operation of the dual-opening mechanism, wherein the door is closed and locked to the cabinet body.
Figure 4:
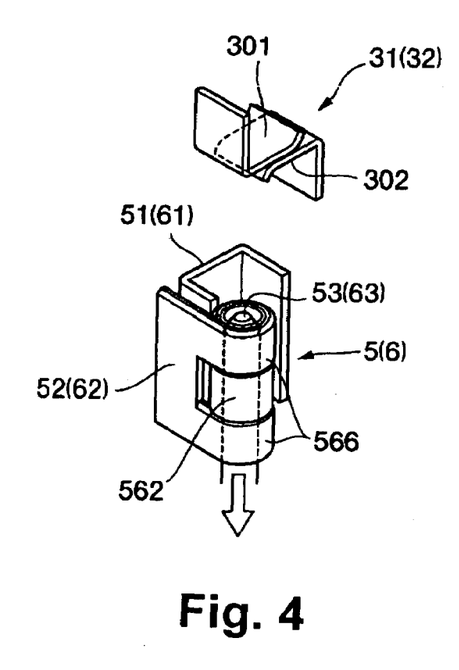
FIG. 4 is a partial perspective view illustrating the operation of the dual-opening mechanism, and showing the state of the hinge and the door position adjusting device when the door is closed.

Next, the opening/closing operation of the door 3 by means of the dual-opening mechanism 4 of a door is explained. Referring to FIG. 3, the door 3, in its original state, is nonpivotably locked with respect to the front face of the cabinet body 1 by means of the first and second pairs of hinges 5 and 6 arranged in the left and right sides thereof. More specifically, as shown in FIG. 4, the upper stationary hinge part 51, 61 is coupled to the upper moving hinge part 52, 62 on each side, with the upper one of the pair of hinge pins 53, 63 inserted upward into the hinge knuckles 562, 566 thereof. The lower stationary hinge part 51, 61 is coupled to the lower moving hinge part 52, 62 on each side, with the lower one of the pair of hinge pins 53, 63 inserted downward into the hinge knuckles 562, 566 thereof. This state is maintained while the handles 91 and 92 of the lock handle devices are pressed down in the housings 783 and 784, respectively, in the front face of the door 3. In other words, the door 3 is locked by means of the first and second pairs of hinges 5 and 6. The handles 91 and 92 may be locked by means of the cylinder locks 93 and 94, respectively.

Figure 5:
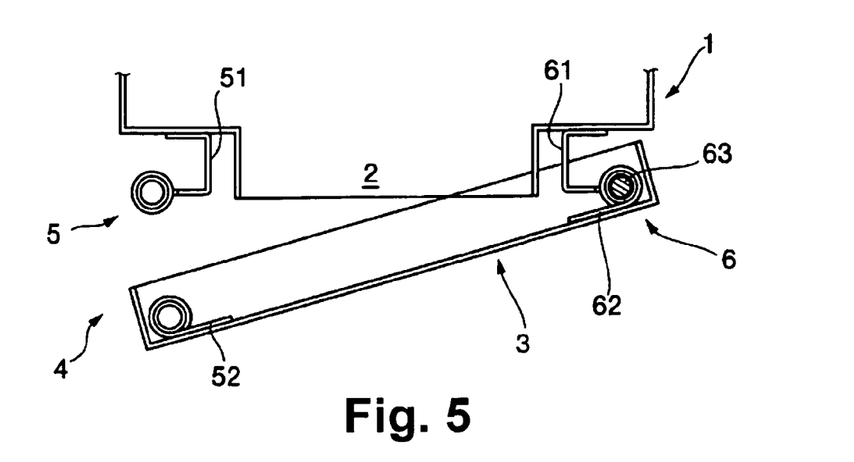
FIG. 5 is a plan sectional view illustrating the operation of the dual-opening mechanism, wherein the door is opened by the operation of the first handle.

From this locked state, by operating, for example as shown in FIG. 5, the first handle 91 to draw the first pair of hinge pins 53, 53 out of the first pair of hinges 5, 5, the door 3 may be opened by pivoting around the second pair of hinge pins 63, 63 coupled to the second pair of hinges 6, 6. Here, by manually lifting up and rotating the first handle 91, the pair of vertical rods 781 of the first hinge pin drive mechanism 7 are moved accordingly in the vertical directions, namely, the upper vertical rod 781 is moved downward, while the lower vertical rod 781 is moved upward. In response to the downward and upward movements of the upper and lower vertical rods 781, 781, respectively, the first pair of hinge pins 53, 53 are in turn moved in the vertical directions, namely, the upper hinge pin 53 is moved downward, while the lower hinge pin 53 is moved upward. Accordingly, the hinge pins 53, 53 are drawn out of the hinge knuckles 562, 566 of the stationary and moving hinge parts 51, 51 and 52, 52 of the first pair of hinges 5, 5. By this operation, the coupling of the each of the first pair of upper and lower hinges 5, 5 is stationary hinge part 51 and the moving hinge part 52 in each of the first pair of upper and lower hinges 5, 5 is released, so that by operating the handle to pull the door 3, the door 3 is pivoted open around the hinge pins 63, 63 coupled to the second pair of hinges 6, 6 on the opposite side.

Figure 6:
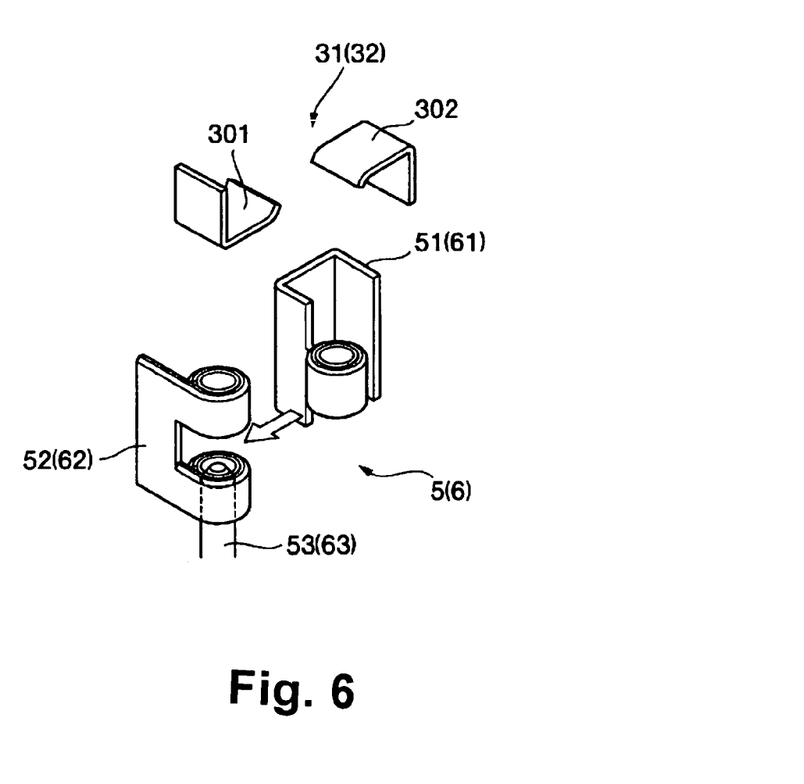
FIG. 6 is a partial perspective view illustrating the operation of the dual-opening mechanism, and showing the state of the hinge and the door position adjusting device when the door is opened.

For closing the door 3, the above operational procedure is followed in reverse order. In this case, in closing the door 3, each follower plate 301 on the door 3 is brought into contact with the end of each guide plate 302 on the cabinet body 1, and slidingly guided onto the upper surface of the guide plate 302, as shown in FIG. 6. In this way, the door 3 is guided by and supported on the guide plates 302 on the cabinet body 1, and led into the right position on the face of the cabinet body 1 having the opening 2. With this positional adjustment of the door 3, the stationary hinge parts 51, 51 and the moving hinge parts 52, 52 are securely aligned, so that the hinge pins 53, 53 are reliably and smoothly inserted into the stationary hinge parts 51, 51 and the moving hinge parts 52, 52, when the first hinge pin drive mechanism 7 is driven by handle operation.

Figure 7:
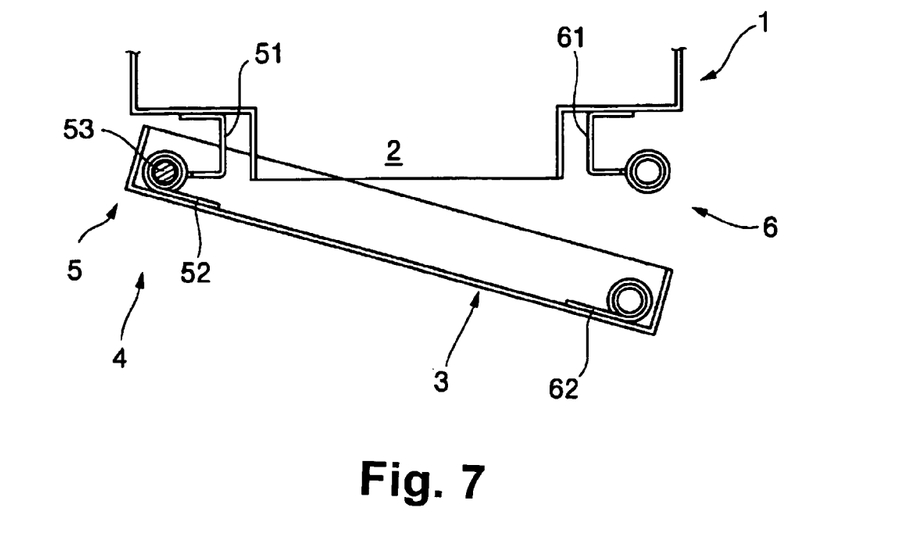
FIG. 7 is a plan sectional view illustrating the operation of the dual-opening mechanism, wherein the door is opened by the operation of the second handle.

Similarly, by operating the second handle 92 to draw the second pair of hinge pins 53, 53 out of the second pair of hinges 6, 6, the door 3 may be opened by pivoting around the first pair of hinge pins 53, 53 coupled to the first pair of hinges 5, 5, as shown in FIG. 7. By reverse operation, the door 3 may be closed.

Further, by simultaneously or successively operating the first and second handles 91 and 92 to draw the first and second pairs of hinge pins 53 and 63 out of the first and second pairs of hinges 5 and 6, the door 3 may be completely unlocked and detached from the cabinet body 1 to fully open the opening 2 in the front face of the cabinet body 1.

In this way, with this dual-opening mechanism 4 of a door, the first and second pairs of stationary hinge parts 51 and 61 in the left and right sides of the cabinet body 1 are coupled to the first and second pairs of moving hinge parts 52 and 62 in the left and right sides of the door 3 by means of the first and second pairs of hinge pins 53 and 63, whereby the door 3 is locked. From this locked state, by selectively operating either one of the first and second handles 91 and 92 to draw either one of the first and second pairs of hinge pins 53 and 63 out of the corresponding one of the first and second pairs of hinges 5 and 6, the door 3 may be opened/closed by pivoting around the other of the first and second pairs of hinge pins 53 and 63 coupled to the corresponding other of the first and second pairs of hinges 5 and 6. Thus the door 3 may be opened from either the left or right side, which allows the cabinet body 1 to be installed in arbitral position and orientation. Even if there is an obstacle on either left or right side of the door 3, the door 3 may still be opened freely from the opposite side. Further, the hinges 5 and 6 function also as locking means.

In addition, by simultaneously or successively operating the first and second handles 91 and 92 to draw the first and second pairs of hinge pins 53 and 63 out of the first and second pairs of hinges 5 and 6, the door 3 may be detached from the cabinet body 1 to fully open the opening 2 in the front face of the cabinet body 1. This allows a large article to be put in and out of the cabinet body 1 easily and effectively.

Further, in this dual-opening mechanism 4 of a door, the hinge knuckle 562 of the stationary hinge part 51, 61 is adapted to be fitted between the hinge knuckles 566, 566 of the moving hinge part 52, 62, and the hinge knuckles 562, 566 are provided with beveled guide portions 563, 567 at their connecting ends to guide the hinge knuckle 562 of the stationary hinge part 51, 61 into or out of the position between the hinge knuckles 566 of the moving hinge part 52, 62. Thus when the door 3 is opened, and the hinge knuckles 566, 566 of the moving hinge part 52, 62 are detached from the hinge knuckle 562 of the stationary hinge part 51, 61, friction between the hinge knuckles 562 and 566 is eliminated to facilitate extraction of the hinge knuckle 562 of the stationary hinge part 51, 61 from between the hinge knuckles 566, 566 of the moving hinge part 52, 62. On the other hand, when the door 3 is closed, and the hinge knuckle 562 of the stationary hinge part 51, 61 is fitted between the hinge knuckles 566, 566 of the moving hinge part 52, 62, friction between the hinge knuckles 562 and 566 is eliminated to lead the hinge knuckle 562 of the stationary hinge part 51, 61 into the position between the hinge knuckles 566, 566 of the moving hinge part 52, 62, and to facilitate coupling of the stationary hinge part 51, 61 to the moving hinge part 52, 62, with the axes of the hinge knuckles 562 and 566 being aligned.

In addition, the quench-hardened collar members 564 and 568 are press fitted on the inner periphery of the hinge knuckles 562 and 566 of the stationary and moving hinge parts 51, 61, 52, 62, and the tip of the hinge pins 53, 63 is tapered and quench-hardened. Thus increase in sliding resistance may be prevented, which is caused by frictional rattling or galling between the hinge pins 53, 63 and the hinge knuckles 562, 566 of the stationary and moving hinge parts 51, 61, 52, 62 upon insertion and removal of the hinge pins 53, 63 with respect to the knuckles 562, 566.

The first and second door position adjusting devices 31 and 32 are combined with the dual-opening mechanism 4 of a door to lead the door 3 into the right position on the front face of the cabinet body 1 having the opening 2 by bringing the follower plates 301 on the door 3 into contact with the ends of the guide plates 302 on the cabinet body 1 and slidingly guiding onto the guide plates 302. Thus, even when the door 3 is very heavy and hangs down when opened, the door 3 may securely be led into the right position on the face of the cabinet body 1 having the opening 2 upon closing the door 3. With this positional adjustment of the door 3, the moving hinge parts 52, 62 may securely be aligned with the stationary hinge parts 51, 61, and the hinge pins 53, 63 may be inserted into the hinges 51, 61, 52, 62 securely and smoothly.

In the embodiment explained above, the dual-opening mechanism for opening a door from either the left or right side has been illustrated. However, by providing this dual-opening mechanism in the upper and lower sides of a door, the door may be opened from either the upper or lower side, and the cabinet may be installed in arbitral position and orientation. Even if there is an obstacle on either the upper or lower side of the door, the door may still be opened freely from the opposite side. Further, the hinges function also as locking means. In this case, the door may also be detached from the cabinet to fully open the cabinet opening.

What is claimed is:

1. A dual-opening mechanism of a door comprising:
   first and second pairs of hinges comprising:
      first and second pairs of stationary hinge parts each having a hinge knuckle, and each pair attached on the opposite sides of an opening of a casing,
      first and second pairs of moving hinge parts releasable from said first and second pairs of stationary hinge parts, each having hinge knuckles, and each pair attached in the opposite sides of a door for opening and closing said opening of the casing, and
      first and second pairs of hinge pins, one pair removably inserted into the hinge knuckles of one of said first and second pairs of stationary hinge parts and into the hinge knuckles of one of said first and second pairs of moving hinge parts, and the other pair into the hinge knuckles of the other of said first and second pairs of stationary hinge parts and into the hinge knuckles of the other of said fist and second pairs of moving hinge parts, to couple said stationary hinge parts to said moving hinge parts;
   first and second hinge pin drive mechanisms, each moving one of said first and second pairs of hinge pins together in inward and outward linear motion to drive the hinge pins into or out of the hinge knuckles of the stationary and moving hinge parts; and
   first and second handles each operatively linked to one of said first and second hinge pin drive mechanisms for operating the first or second pair of hinge pins;
   wherein the door is opened/closed by selectively operating either one of said first and second handles to draw either one of said first and second pairs of hinge pins out of the corresponding one of said first and second pairs of hinges, and pivoting the door around the other pair of hinge pins coupled to the corresponding other of the first and second pairs of hinges.

2. The dual-opening mechanism of a door according to claim 1, wherein the hinge knuckle of each stationary hinge part is adapted to be fitted between the hinge knuckles of each moving hinge part, and at least one of the hinge knuckles of the stationary and moving hinge parts is provided with beveled guide portions at its connecting ends for guiding the hinge knuckle of the stationary hinge part into or out of the position between the hinge knuckles of the moving hinge part.

3. The dual-opening mechanism of a door according to claim 1, wherein a quench hardened collar member is press fitted on the inner periphery of each hinge knuckle of the stationary and moving hinge parts, and each hinge pin has a tapered tip and has been quench hardened.

4. The dual-opening mechanism of a door according to claim 1, further comprising a door position adjusting device comprising:
   a follower part formed on the door, said follower part projecting toward the casing, and having an end curved outward;
   a guide part formed on the casing, said guide part projecting toward the door, and having an end curved inward;
   wherein, in closing the door, said follower part is brought into contact with the end of the guide part, and slidingly guided onto the outer surface of the guide part to lead the door into a right position on the face of the casing having the opening.

* * * * *